United States Patent [19]

Grondalski

[11] 4,342,080
[45] Jul. 27, 1982

[54] COMPUTER WITH MICROCODE GENERATOR SYSTEM

[75] Inventor: David Grondalski, Hopkinton, Mass.

[73] Assignee: Data General Corporation, Woburn, Mass.

[21] Appl. No.: 91,347

[22] Filed: Nov. 5, 1979

Related U.S. Application Data

[63] Continuation-in-part of Ser. No. 959,038, Nov. 8, 1978, Pat. No. 4,316,244.

[51] Int. Cl.³ .............................................. G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,478,322 | 11/1969 | Evans | 364/200 |
| 3,949,370 | 4/1976 | Reyling, Jr. et al. | 364/200 |
| 3,990,054 | 11/1976 | Perlowski | 364/200 |
| 4,037,202 | 7/1977 | Terzian | 364/200 |
| 4,099,229 | 7/1978 | Kancler | 364/200 |
| 4,130,869 | 12/1978 | Kinoshita et al. | 364/200 |

OTHER PUBLICATIONS

Alexandridis, N. A., "Bit-Sliced Microprocessor Architecture", Computer, Jun. 1978, pp. 56-81.

*Primary Examiner*—Gareth D. Shaw
*Assistant Examiner*—Thomas M. Heckler
*Attorney, Agent, or Firm*—Donald Brown

[57] ABSTRACT

A computer system which includes an improved apparatus for generating microcode instructions to produce a starting address. A portion of the address information is applied to a plurality of banks of memory and another portion of the address is used to enable a selected portion of the memory to provide microinstructions.

4 Claims, 4 Drawing Figures

COMPUTER WITH MICROCODE GENERATOR SYSTEM

PRIOR APPLICATION

This invention is a continuation in part of my U.S. patent application Ser. No. 959,038 filed Nov. 8, 1978, now U.S. Pat. No. 4,316,244, entitled High-Speed Digital Computer System.

BACKGROUND OF THE INVENTION

This invention is directed to the generation of control signals for causing various components of a computer system to perform an operation. The entire contents of my earlier application, Ser. No. 959,038 filed Nov. 8, 1978, now U.S. Pat. No. 4,316,244, is incorporated by reference herein by this reference hereto.

In this invention, a particular macroinstruction, Load Accumulator (LDA), is logically deciphered to generate a first control signal which is then used to generate control signals depending upon the contents thereof to control parts of the computer in order to cause a word in memory to be copied from memory and be placed in an accumulator. The LDA macroinstruction places the word in memory addressed by this effective address, E in the user-specified accumulator. The previous contents of the memory location remain unchanged. In the LDA instruction "AC" (bits 3 and 4) indicates one of the four accumulators in the computer in which the data in memory is to be read into. Bits 5 to 15 are used for effective address calculations to determine the position of the information in memory to be placed in the designated accumulator. In the LDA macroinstruction bit 5 is called the "indirect bit", bits 6 and 7 are called the "index bits", and bits 8-15 are called the "displacement bits".

If the index bits are 00, the displacement is used as an unsigned 8-bit number to address one of the first $256_{10}$ words in memory. This is called "page zero addressing" and this first block of 256 words is known as "page zero".

If the index bits are 01, the displacement is treated as a signed, two's complement number, which is added to the address of the instruction to produce a memory address. This is called "relative addressing". By relative addressing, any instruction which uses the effective address calculation can directly address any word in storage whose address is in the range $-128_{10}$ to $+127_{10}$ from the instruction.

If the index bits are 10, accumulator 2 is used as an index register. If the index bits are 11, accumulator 3 is used as an index register. In this form of word addressing, known as "index register addressing", the displacement is treated as a signed, two's complement number which is added to the contents of the selected index register to produce a memory address. In index register addressing the addition of the displacement to the contents of index register does not change the value contained in the index register.

The result of the addition performed in relative addressing and index register addressing is "clipped" to 15 bits. In other words, the high order bit of the result is set to 0. For example, if accumulator 2 is to be used as an index register and contains the number $077774_8$, and the displacement bits contain the number $012_8$, then the result of the addition would be $000006_8$, not $100006_8$.

After one of the three types of addresses has been computed from the index and displacement bits, the indirect bit is tested. If this bit is zero, the address already computed is taken as the effective address. If the indirect bit is one, the word addressed by the result of the index and displacement bits is assumed to contain an address. In this word bit 0 is the indirect bit and bits 1-15 contain an address. If bit 0 of the reference word is 1, another level of indirection is indicated, and bits 1-15 contain the address of the next word in the indirection chain. The processor will continue to follow this chain of indirect addresses until a word is retrieved with bit 0 set to 0. Bits 1-15 of this word are taken to be the effective address.

The recognition of index bits 6 and 7 as well as bits 0 to 2 are used in this invention to generate microcode control signals ($\mu$ or microinstruction) to cause the storing of data at a particular memory address to be stored in designated accumulators. The control signals so generated comprise fifty-six (56) bit words in the embodiment shown with certain of the bits being provided to various computer subsystems to effect the transfer of information from memory. Since the invention herein resides in the generating of specific control signals which are thereafter handled in a routine manner the further use of these control signals will not be discussed in detail.

BRIEF STATEMENT OF THE INVENTION

In this invention, a particular macroinstruction LDA (Load Accumulator) is provided to an address generator and particular bits thereof are used to generate a starting address. The starting address is utilized to address a particular location in microcode memory and thereby generate, depending on the address, a particular control code to initiate a number of steps needed to store a word in a selected accumulator.

DETAILED DESCRIPTION OF THE PREFERRED EMBODIMENT

Figure 1:
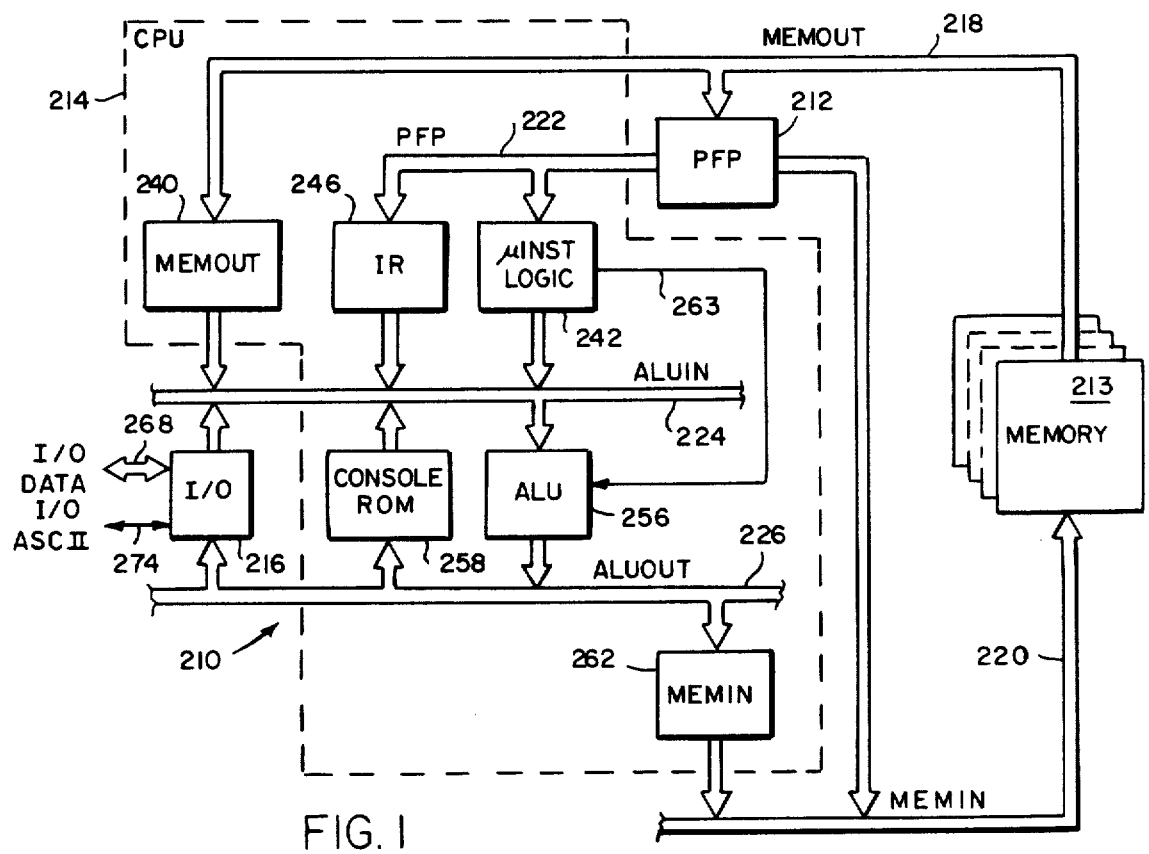
FIG. 1 is a partial block diagram of the computer system in which the microcode control signals are developed to perform a load accumulator function.

Referring now to FIG. 1, a partial block diagram showing architecture of a computer incorporating the present invention is depicted. A MEMIN bus 220 is illustrated as being coupled to provide information to one or more sub-memories 213. The one or more sub-memories 213 may be connected in parallel to MEMIN bus 220 and MEMOUT bus 218 and, when so connected, will operate together as computer memory 211. At 214 there is shown a central processor unit (CPU) which has direct access to memory 211 outputs through MEMOUT bus 218 and its MEMOUT register 240. CPU 214 also has direct input access through its MEMIN register 262. In computer 210, macroinstructions are transferred through MEMOUT bus 218 into pre-fetch processor (PFP) 212. Macroinstructions are transferred from PFP 212 through bus 222 to instruction register (IR) 246 and to $\mu$ (micro) instruction Logic 242 for generating microcode (microinstruction) control signals for causing certain of the macroinstructions to be implemented. The arithmetic and logic unit (ALU) is coupled to the bus 224 and thus some of the microcoded signals are applied to it from the µ INST LOGIC 242. At 258 there is disclosed a console ROM which allows any external ASC II interface device to directly control the operation of the computer. At 216 there is provided I/O interface device for the transfer of data into and out of the machine. At 263 there is a control bus for providing ALU controls from µ instruction logic to the ALU.

Figure 3:
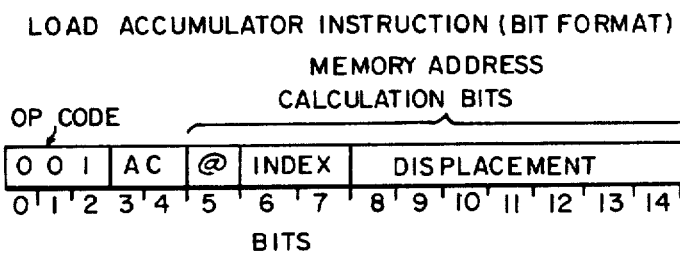
FIG. 3 illustrates the Macrocoded Load Accumulator Instruction and FIG. 4 illustrates the starting address control signals for generating microinstruction control signals.
Figure 4:
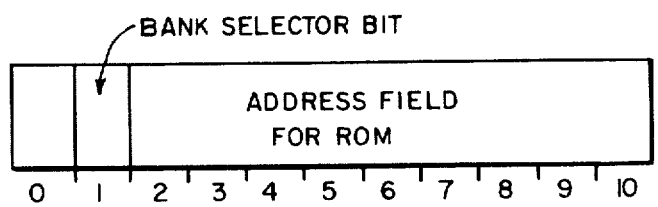
Figure 2:
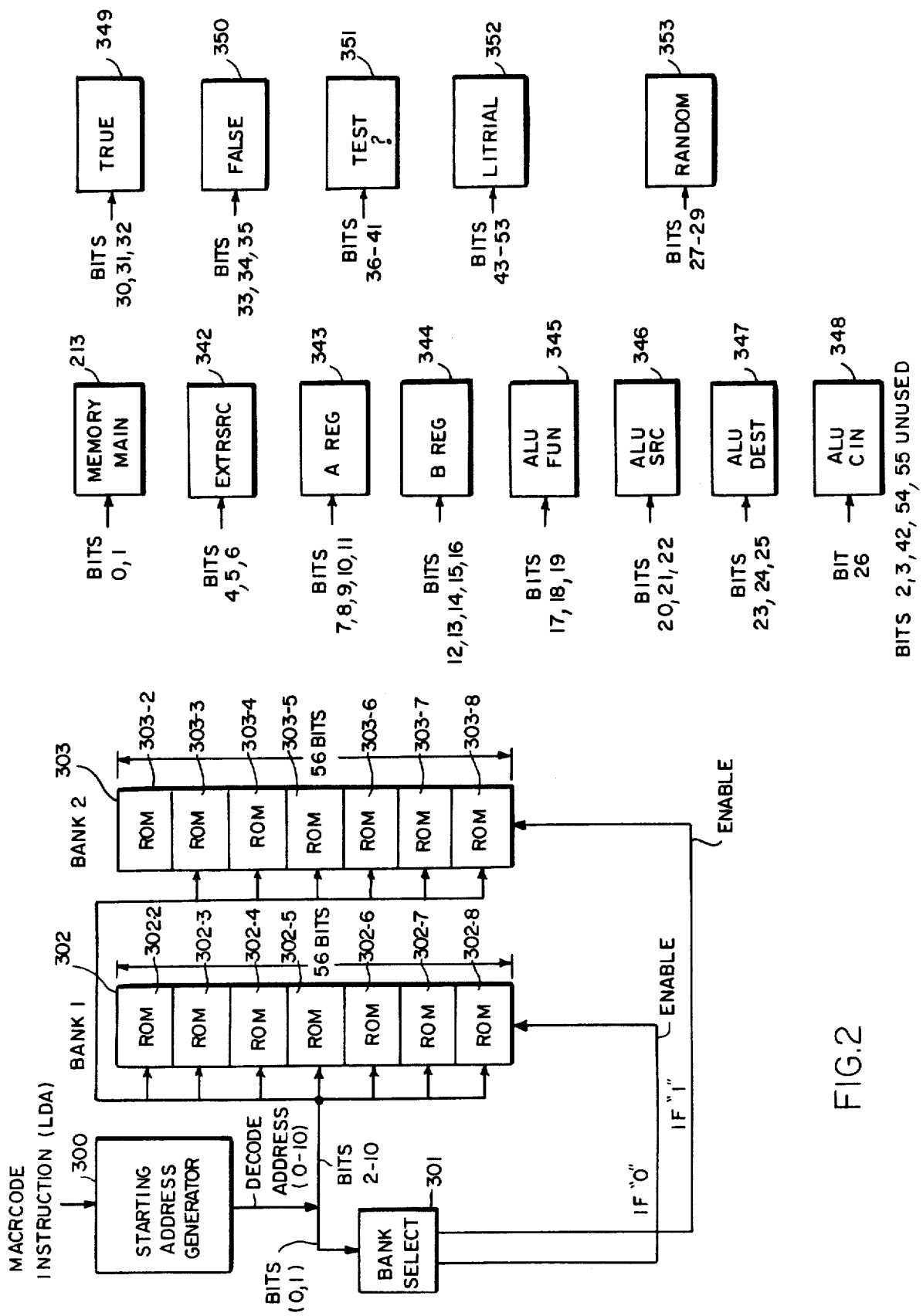
FIG. 2 is a block diagram illustrating the blocks for developing the starting control signals for a load accumulator command.

At this time reference should be had to FIG. 2 taken in conjunction with FIGS. 3 and 4 which disclose this apparatus for generating microcode control signals in accordance with the macrocode instruction. Since this application is directed to the generation of LDA microcode control signals, the explanation will be provided with regard to that instruction. However it should be noted that the same position bits in the generated microcode word are applied to the portion of the computer to accomplish other functions in response to a macrocode instruction.

FIG. 3 illustrates a Load Accumulator instruction (LDA) which is used to place a word in memory at a particular address.

The LDA instruction is applied to a conventional starting address generator 300 which utilizes bits 0 to 3 and 6 and 7 of the LDA macrocode instruction to generate an eleven bit address in accordance with the table below:

| MACROCODE INSTRUCTION | | NEW ADDRESS GENERATED |
|---|---|---|
| Bits 0,1,2 | Bits 5,6 | 11 Bits |
| 001 | 11 | 01111000001 |
| 001 | 10 | 01111010001 |
| 001 | 01 | 01111100001 |
| 001 | 00 | 01111110001 |

The second bit of the new address generated by the starting address generator 300 is then tested in a bank selector to generate an enable signal for the first bank 302 of seven read only memories (ROM) and address bits 2 to 10 (the last nine bits) of the the new address are applied to the inputs of the ROMS. Each ROM is a 9×8 matrix and may be readily purchased from Monolithic Memories Inc., or others. Each bank of ROMS is a 9×56 matrix. Each address bit 2 to 10 is applied to each ROM of the bank.

If bit 1 of the starting address is a 1, bank 303 is selected (enabled) and if bit 1 is a binary 0, 302 is selected.

The starting addresses expressed in octal produce the 56 bit patterns as shown below:

BIT MAP
LISTING OF MICROCODE FROM THE BANK OF ROMS 303

| M | U | E | A | B | A | A | A | AR | T | F | T | UL | U |
| E | N | X | R | R | L | L | L | LA | R | A | E | NI | N |
| M | U | T | E | E | U | U | U | UN | U | L | S | UT | U |
| O | S | S | G | G | F | S | D | CD | E | S | T | SE | S |
| R | E | R | . | . | U | R | E | IO | . | E | . | ER | E |
| Y | D | C | . | . | N | C | S | NM | . | . | . | DA | D |
| . | . | . | . | . | . | . | T | .. | . | . | . | .L | . |
| . | . | . | . | . | . | . | . | .. | . | . | . | .. | . |

Address
003701 00XX10110011110100001010110000010000101000X10010110011XX
003721 00XX10110010110100001010110000010000101000X10010110011XX
003741 00XX01011000110110011010110000111111111111X11111111111XX
003761 00XX10111111110100111110110000010000101000X10010110011XX The microcode generated by the ROM Bank 302 or 303 (303 for the LDA instruction) is applied as shown to main memory control (bits 0, 1) and the other functional blocks designated as 342 to 353 as shown in the block diagram. Bits or field (0,1) of the microcode, if a 10 controls reading out of the main memory and bits 10 if a 11 controls writing into main memory.

The field EXTR. SRC 342 determines what external source is applied to the ALU depending on the bit pattern of bits 4,5,6. The field 7 to 11 specifies a specific internal register of A REG 343 in the ALU to be used. The fields (bits) 12 to 16 of the microde specifies a specific internal register of BREG 344 in the ALU to be used. The block ALU FUN 345 determines from microcode bits 17, 18 and 19, the specific function to be accomplished by the ALU. Bits 20 to 22 of the microcode indicates to the ALU where the data to be operated on is located and bits 23 to 25 when decoded by Block ALU DEST indicates where the result of the ALU computation is to be placed. Bit 26 is used by block ALU CIN 345 to subtract a one or add a one to the final result. Microcode bits 30 to 32 indicate the source of the next microcode address applied to block 349 if the test condition is true and microcode bits 33 to 35 applied to block 350 are the source of the next microcode address if the test condition is false. Bits 36 to 41 are detected in block 351 and indicates what is to be tested in the ALU. Microcode bits 43 to 53 applied to literal field block 352 indicates the address which may be used by the microinstruction logic to generate the next address in the bank. Bits 43 to 46 are also in conjunction with microcode bits 27 to 29 applied to block 353 specifies a random operation to be performed by the CPU. Bits 43 to 53 are also used as a data for ALU. The blocks 342-353 although numbered are only for purposes of identifying the purpose of the microcode bits of the generated microcode.

In the case of the LDA macrocode instruction, when the octal starting address code 3741 is generated therefrom, the microcode bit pattern generated causes (1) the formation of the program counter, i.e., the address of the next macroinstruction to execute and stores it in the ALU and (2) causes generation of next address in the ROM bank 2 by a microsequencer (not shown).

In the case of the LDA macrocode instruction where the octal starting address code 3761 is generated, the following is caused to occur in the CPU: (1) the displacements bits of the macrocode instruction are added to an accumulator and the result is placed in the address register of the ALU (2) macroinstruction bit 5 is tested and if 0 causes decode to be performed and produces a 3510 (octal) address to generate next microcode instruction and (3) macroinstruction bit 5 is tested and if a 1, the literal bits (field) are applied to the ROM bank 2 as the next address.

In the situation where octal 3721 is initially generated from the LDA macrocode, the displacement bits of the macrocode are added to the accumulator 2 and the result is placed in the address register of the ALU. The number functions (2) and (3) described with reference to instruction 3761 are also caused to occur. Where the octal code 3701 is generated as the starting address the same functions occur as with the microcode address code 3721, except the address register accumulator 3 is designed instead of accumulator 2.

It should be understood that what has been described above is the initial step of decoding one of four LDA instructions to generate the starting address applied to generate the initial microcode control signals from the ROMS. Thereafter, other microcode control signals are generated until the LDA function is completed at which time the CPU moves on to the next macrocode instruction.

I claim:

1. A computer system comprising a main memory, means for providing an LDA macrocode instruction, and a CPU having a plurality of accumulators and microinstruction logic for generating a microcode control word for causing the transfer of a word in main memory to an accumulator of the CPU, said microinstruction logic generating one of a plurality of address words from portions of said LDA macrocode instructions, said logic having a microcode control word generator comprising a plurality of banks of control memories, and said logic having means for applying portions of the bits of said address words to the input of said banks of said memories and said logic having means responsive to at least one bit of said generated address words for selectively enabling one bank of said plurality of banks of said memories to produce a microcode control word.

2. In a computer system according to claim 1 in which the microcode control word includes an eleven bit literal field representing the next address in the microcode control word generator means.

3. In a computer system according to claim 1 in which the macrocode instruction includes displacement bits and in which one of the address words includes bits which are usable by the computer system to add the displacement bits of the macrocode instruction to an accumulator.

4. The system according to claim 1 in which said logic generates one of four possible address words from said LDA macrocode instruction.

* * * * *